United States Patent
Abdel-Rahman

(10) Patent No.: US 10,050,443 B1
(45) Date of Patent: Aug. 14, 2018

(54) PFC CONTROLLER ADD-ON CIRCUIT TO STABILIZE THDI PERFORMANCE

(71) Applicant: Infineon Technologies Austria AG, Villach (AT)

(72) Inventor: Osama Abdel-Rahman, Raleigh, NC (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/679,892

(22) Filed: Aug. 17, 2017

(51) Int. Cl.
| | |
|---|---|
| H02M 1/42 | (2007.01) |
| H02J 3/01 | (2006.01) |
| H02J 3/18 | (2006.01) |
| G05F 1/70 | (2006.01) |
| H02M 7/217 | (2006.01) |

(52) U.S. Cl.
CPC ............... H02J 3/01 (2013.01); G05F 1/70 (2013.01); H02J 3/18 (2013.01); H02M 1/425 (2013.01); H02M 1/4208 (2013.01); H02M 1/4225 (2013.01); H02M 7/217 (2013.01)

(58) Field of Classification Search
CPC .. H02M 1/4208; H02M 1/4225; H02M 1/425; H02M 7/217; G05F 1/70
See application file for complete search history.

(56) References Cited

U.S. PATENT DOCUMENTS

| | | | | |
|---|---|---|---|---|
| 7,893,663 B2 * | 2/2011 | Ng | ............................ | G05F 1/70 323/207 |
| 8,379,420 B2 * | 2/2013 | Orr | ..................... | H02M 1/4208 323/222 |
| 2004/0160128 A1 | 8/2004 | Athari | | |
| 2006/0192537 A1 | 8/2006 | Hagen et al. | | |
| 2008/0310201 A1 | 12/2008 | Maksimovic | | |
| 2011/0006748 A1 | 1/2011 | Jang et al. | | |
| 2013/0033910 A1 | 2/2013 | Carletti et al. | | |
| 2014/0063868 A1 | 3/2014 | Shih et al. | | |

(Continued)

FOREIGN PATENT DOCUMENTS

| | | |
|---|---|---|
| WO | 2007037997 A1 | 4/2007 |
| WO | 2008137315 A1 | 11/2008 |

OTHER PUBLICATIONS

Sandler et al, Quantifying Harmonic Distortion in Nonisolated Boost PFC; Power Electronic Technology, Jan. 2009.*

(Continued)

*Primary Examiner* — Emily P Pham
(74) *Attorney, Agent, or Firm* — Shumaker & Sieffert, P.A.

(57) ABSTRACT

A total harmonic distortion (THDi) reduction circuit for a power factor correction (PFC) controller to control a PFC stage. The THDi reduction circuit determines whether an input signal, such as an alternating current (AC) line voltage is a high voltage or low voltage signal. For a high voltage input signal, the THDi reduction circuit may limit the duty cycle of a control signal to a PFC stage to minimize a voltage spike at the zero-crossing point of the input signal and thereby minimize THDi. For a low voltage input signal, the THDi reduction circuit may extend the duty cycle of the control signal to the PFC stage, while ensuring that the control signal has at least a predetermined off-time, i.e. the duty cycle is less than 100 percent. Extending the control signal duty cycle, especially for low voltage input signals under high load, may minimize THDi.

20 Claims, 12 Drawing Sheets

(56) References Cited

U.S. PATENT DOCUMENTS

| | | |
|---|---|---|
| 2014/0232367 A1 | 8/2014 | Kuo et al. |
| 2015/0062987 A1* | 3/2015 | Chen ................. H02M 1/32 363/89 |
| 2015/0229204 A1 | 8/2015 | Mao et al. |
| 2016/0020691 A1* | 1/2016 | Yoon ............. H02M 1/4258 323/284 |
| 2016/0043634 A1 | 2/2016 | Bemat et al. |
| 2017/0093281 A1* | 3/2017 | Kim ................. H02M 3/158 |
| 2017/0194869 A1* | 7/2017 | Yao ............. H02M 3/33515 |

OTHER PUBLICATIONS

Williams, "Understanding, Calculating, and Measuring Total Harmonic Distortion (THD)," Feb. 20, 2017, retrieved from https://www.allaboutcircuits.com/technical-articles/the-importance-of-total-harmonic-distortion/, 10 pp.

\* cited by examiner

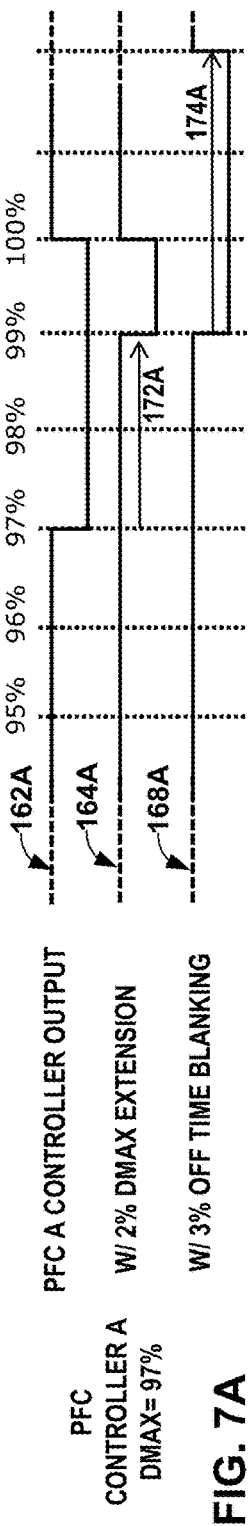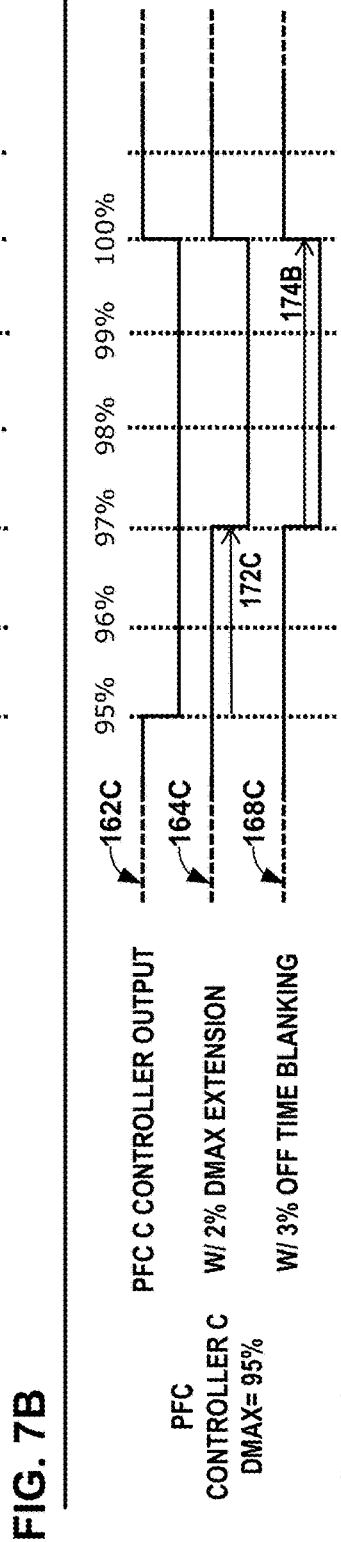

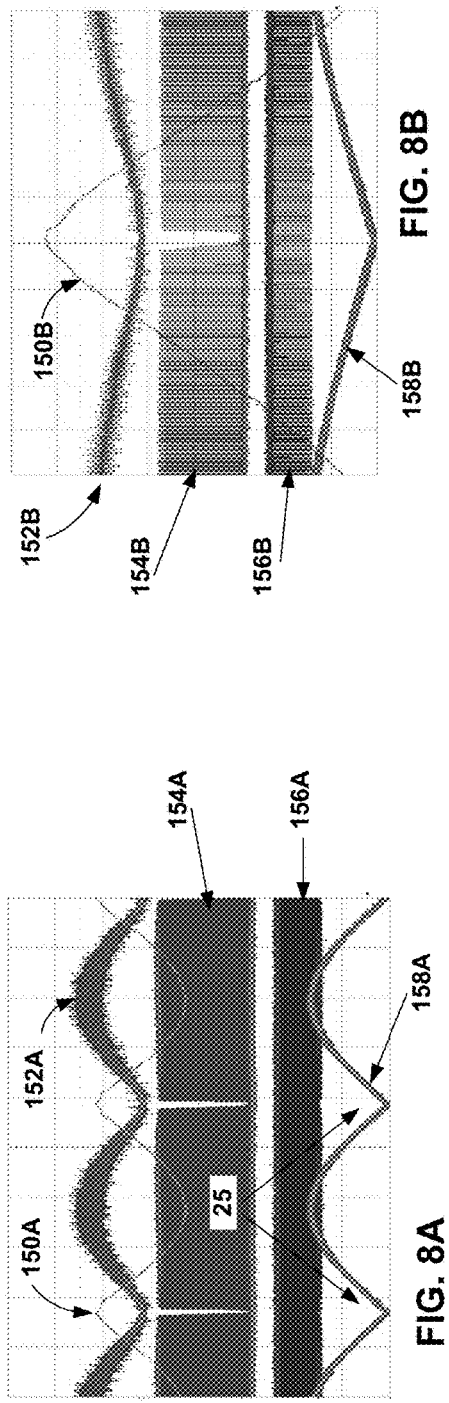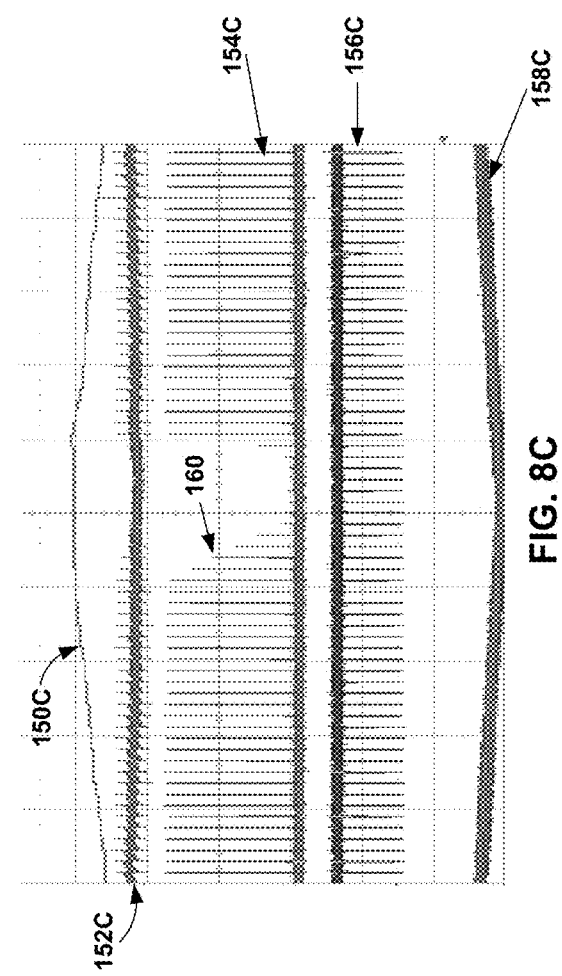

| Input voltage | Current (A) | Load % | THDi Spec | THD-I WITHOUT THD-I REDUCTION CIRCUIT 202 | | THD-I WITH THD-I REDUCTION CIRCUIT 203 | |
|---|---|---|---|---|---|---|---|
| | | | | IC # 1 | IC # 2 | IC # 1 | IC # 2 |
| 115Vac LOW VOLTAGE AC INPUT SIGNAL 204 | 5 | 8% | 13.1% | 6.2 | 8.3 | 7.2 | 11 |
| | 10 | 16% | 8.6% | 5.8 | 5.4 | 5.3 | 5.9 |
| | 18 | 29% | 6.8% | 5.5 | 4.1 | 4.7 | 3.6 |
| | 36 | 58% | 4.8% | 4.9 (fail) | 3.4 | 3.7 | 2.1 |
| | 50 | 80% | 4.5% | 5.4 (fail) | 3.7 | 3.7 | 2.3 |
| | 60 | 96% | 4.2% | 5.5 (fail) | 3.7 | 3.7 | 2.4 |
| 230Vac HIGH VOLTAGE AC INPUT SIGNAL 206 | 5 | 8% | 10.7% | 7.5 | 11 (fail) | 7.5 | 8.3 |
| | 10 | 16% | 7.8% | 6.5 | 6.8 | 5.9 | 7.4 |
| | 18 | 29% | 6.7% | 4.1 | 5 | 4.8 | 4 |
| | 36 | 58% | 4.7% | 3.3 | 3.2 | 3.3 | 3.7 |
| | 50 | 80% | 4.0% | 3 | 2.7 | 2.6 | 3 |
| | 60 | 96% | 3.5% | 2.8 | 2.4 | 2.6 | 3 |

FIG. 10

PFC CONTROLLER ADD-ON CIRCUIT TO STABILIZE THDI PERFORMANCE

TECHNICAL FIELD

The disclosure relates to power factor correction circuits.

BACKGROUND

Power supplies that convert alternating current (AC) to direct current (DC) may include front end Power Factor Correction (PFC) stage. The PFC stage may function in part as a resistive load to the AC power source, (e.g. the power grid). Some performance measurements of AC circuits may include power factor (PF) and total harmonic distortion (THD). PF is the ratio of actual electrical power dissipated by an AC circuit to the product of the root mean square (r.m.s.) values of current and voltage. PF indicates the amount of reactive power that does no useful work. THD comprises total voltage harmonic distortion (THDv) and total current harmonic distortion (THDi).

SUMMARY

In general, the disclosure is directed to a total harmonic distortion (THDi) reduction circuit for a power factor correction (PFC) controller that controls a PFC stage of an AC to DC power supply, or similar AC circuit. The THDi reduction circuit determines whether an input signal, such as an alternating current (AC) line voltage is a high voltage or low voltage signal. For a high voltage input signal, the PFC controller circuit may limit the duty cycle of a control signal to a PFC stage to minimize a voltage spike at the zero-crossing point of the input signal and thereby minimize THDi. For a low voltage input signal, the THDi reduction circuit may extend the duty cycle of the control signal to the PFC stage, while ensuring that the control signal has at least a predetermined off-time, i.e. the duty cycle is less than 100 percent. Extending the control signal duty cycle, especially for low voltage input signals under high load, may minimize THDi.

In one example, the disclosure is directed to a circuit comprising a maximum duty cycle (DMAX) extension element, and a rising edge blanking element operatively coupled to the DMAX extension element. The DMAX extension element may be configured to adjust a duty cycle of a first switching cycle of a control signal, and the rising edge blanking element may be configured to blank the rising edge of a second switching cycle of the control signal. The second switching cycle is the next switching cycle subsequent to the first switching cycle, and the rising edge blanking element causes the control signal to include at least a predetermined off-time.

In another example, the disclosure is directed to a circuit comprising: a driver circuit, wherein the driver circuit is configured to output a signal to a power factor correction (PFC) stage, and a total harmonic distortion (THDi) reduction circuit operatively coupled to the driver circuit, wherein the output of the THDi circuit is configured to regulate the signal output by the driver circuit. The THDi reduction circuit comprises: a maximum duty cycle (DMAX) extension element configured to adjust a duty cycle of a first switching cycle of a control signal, and a rising edge blanking element operatively coupled to the DMAX extension element. The rising edge blanking element may be configured to blank the rising edge of a second switching cycle of the control signal. The second switching cycle is the next switching cycle subsequent to the first switching cycle, and the rising edge blanking element causes the control signal to include at least a predetermined off-time.

In another example, the disclosure is directed to a method comprising: determining whether voltage of an alternating current (AC) input signal exceeds a voltage threshold. In response to determining that the AC input signal exceeds the voltage threshold, adjusting a duty cycle of a control signal by setting the on-time of the control signal to be no more than a threshold on-time. In response to determining that the AC input signal does not exceed the voltage threshold, adjusting a duty cycle of a control signal by extending the on-time of the control signal by a predetermined amount of on-time, wherein the duty cycle of the control signal includes at least a predetermined off-time.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 7A-7C are timing graphs illustrating DMAX extension and rise time blanking for some examples of PFC controllers, in accordance with one or more techniques of this disclosure.

FIGS. 8A-8C are graphs illustrating the operation of a PFC stage controller circuit for a low voltage AC input signal, such as may be seen on an oscilloscope.

FIG. 10 is a table illustrating the performance of an example PFC stage controller circuit both with and without a THDi reduction circuit.

DETAILED DESCRIPTION

Figure 1A:
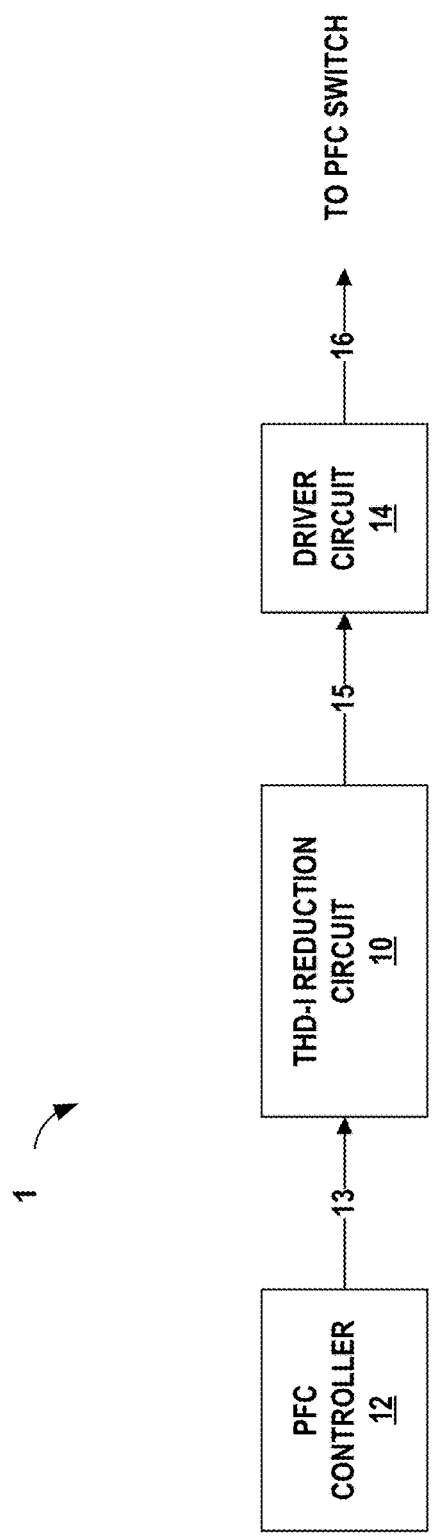
FIG. 1A is a block diagram illustrating an example PFC stage controller circuit that includes a THDi reduction circuit, in accordance with one or more techniques of this disclosure.

The disclosure is directed to a total current harmonic distortion (THDi) reduction circuit for a power factor correction (PFC) controller that controls a PFC stage of an AC to DC power supply, or similar AC circuit. The main function of a PFC stage is to behave as a resistive load to the AC supply, such as the power grid, and improve power quality by limiting the frequency harmonics. Ideally the line current from the AC supply should only contain the fundamental component, which is the line frequency (50/60 Hz). For example, in the United States, the power grid delivers AC power at 60 Hz, in Europe, Japan and some other countries, the power grid delivers AC power at 50 Hz. However, in reality the line current will also include some higher harmonics, which will increase the measured THDi. Harmonics or harmonic frequencies of a periodic voltage or current are frequency components in the signal that are at integer multiples of the frequency of the main signal.

A small THDi is desirable for power supply, and other AC circuit performance. For example, some sensitive DC loads may perform poorly when receiving power with higher THDi. In other examples, the efficiency and useful life of some motors may be negatively impacted by higher THDi. PFC controller limitations may cause THDi to be higher at some line and load conditions. Furthermore, THDi may be dependent on the variations of such controller limits in some operating conditions. Variations in controller limits may be caused by variation in manufacturing assembly and in the components used to build the controllers, as well as other causes.

There are several techniques to improve the THDi performance. In the example of a PFC stage that is a boost converter, some THDi improvement techniques may include optimization of the boost inductor and including filter designs to filter any current spikes generated by the PFC stage, which may also be referred to as a power stage. Other techniques may include optimization of the voltage and current control loops, to ensure the PFC stage is generating a current reference that is well synchronized to the line voltage, and to ensure that the current loop is dynamic enough to track the commanded sinusoidal reference with minimum delay and error.

Although, the above techniques may reach close to a unity power factor (PF) with low THDi, any variation of the PFC controller parameters, e.g. component variation, may cause fluctuation in THDi performance. In other words, the techniques discussed above are desirable to enhance THDi, across the operation range. However, the tolerance of the controller parameters can cause noticeably high THDi in some operating conditions, leading to THDi specification failure. THDi specification failure means the AC circuit, e.g. AC-DC power converter, exceeds a specified THDi limit.

The THDi reduction circuit according to the techniques of this disclosure, determines whether an input signal, such as an alternating current (AC) line voltage is a high voltage or low voltage signal. For a high voltage AC input signal, the THDi reduction circuit may limit the duty cycle of a control signal to a PFC stage to minimize a voltage spike at the zero-crossing point of the input signal and thereby minimize THDi. This is because in some examples, a high voltage AC input signal, such as the line voltage from the power grid, may cause a voltage spike at the zero-crossing point, especially for a circuit that has a low or light load. In one example, a light load may be a load that is less than ten percent of the maximum load.

For a low voltage AC input signal, the THDi reduction circuit may extend the duty cycle of the control signal to the PFC stage, while ensuring that the control signal has at least a predetermined off-time, i.e. the duty cycle is less than 100 percent. Extending the control signal duty cycle, especially for low voltage AC input signals under high load, may reduce THDi. In some examples, a high or heavy load may be a load that is more than fifty percent of the maximum load.

FIG. 1A is a block diagram illustrating an example PFC stage controller circuit that includes a THDi reduction circuit, in accordance with one or more techniques of this disclosure. The PFC stage controller circuit 1 depicted in FIG. 1A includes PFC controller 12, THDi reduction circuit 10 and driver circuit 14.

PFC controller 12 outputs a control signal 13, that may be a pulse width modulated (PWM) control signal to THDi reduction circuit 10. PFC controller 12 may be a digital or analog circuit, or some combination. PFC controller 12 may also be a processor, such as a microprocessor circuit, field programmable gate array (FPGA) or similar circuit. PFC controller 12 may have some limitations can cause THDi to be higher at some line and load conditions. In some operating conditions, the production variation of some parameters of the PFC controller can impact THDi. In one example, PFC controller 12 may be capable of outputting control signal 13 with a maximum duty cycle (DMAX) of 97%. In other examples, PFC controller 12 may be limited to a DMAX of 95%. As will be discussed in more detail below, a limited DMAX of PFC controller 12 may introduce THDi into the output of an AC circuit. Some examples of AC circuits that may benefit from including THDi reduction circuit 10 may include AC-DC converters such as AC-DC switch mode power supplies. Though THDi reduction circuit 10 may benefit other types of circuits, for simplicity, this disclosure will focus on AC-DC converter circuits.

THDi reduction circuit 10 may include a sensing element (not shown in FIG. 1) to sense an input signal to an AC-DC converter (not shown in FIG. 1). In some examples, the input signal (not shown in FIG. 1) may come from line voltage, such as a power grid or from some other AC power supply. In some examples, THDi reduction circuit 10 may be desirable for AC-DC converters under two different operating conditions. In a first operating condition, the input signal to the AC-DC converter is a low voltage signal while the output of the AC-DC converter supplies a heavy load. The second operating condition is a high voltage AC input signal to the AC-DC converter while the output of the AC-DC converter supplies a light load. In this disclosure light load and low load may be used interchangeably. Similarly, heavy load or high load may also be used interchangeably.

For example, in the United States and Japan, the line voltage from the power grid is approximately 110-120 V. The line voltage of 120 V may be considered low voltage when compared to the line voltage in other locations. For example, in Europe, the line voltage is approximately 230V, while in the United Kingdom the line voltage is 240V. An input signal of approximately 230V may be considered a high voltage AC input signal. These voltages are just examples used for illustration. The THDi reduction circuit of this disclosure may be tuned to determine "high voltage" or "low voltage" at a variety of voltage levels, not limited to the examples above.

THDi reduction circuit 10 may determine whether the input signal, such as an AC line voltage is a high voltage or low voltage signal. THDi reduction circuit 10 receives control signal 13 from PFC controller 12. For the first operating condition, a low voltage AC input signal, the THDi reduction circuit may extend the duty cycle of control signal 13, while ensuring that control signal output to the PFC stage has at least a predetermined off-time. In other words, THDi reduction circuit may ensure the duty cycle is less than 100 percent. Extending the control signal duty cycle, especially for low voltage AC input signals to an AC-DC converter supplying a high load, may reduce THDi.

For the second operating condition, a high voltage AC input signal, THDi reduction circuit 10 of PFC stage controller circuit 1 may limit the duty cycle of control signal 13. In some examples, a high voltage AC input signal, such as the line voltage from the power grid, may cause a voltage spike at the zero-crossing point, especially for a circuit that has a low load. Limiting the duty cycle to minimize a voltage spike at the zero-crossing point of the input signal may minimize THDi.

Driver circuit 14 receives modified control signal 15 from THDi reduction circuit 10 and outputs a driver signal 16 to a PFC switch this may be a component of the PFC stage (not shown in FIG. 1). Driver circuit 14 may amplify, filter, level change or otherwise condition modified control signal 15 into driver signal 16.

Figure 1B:
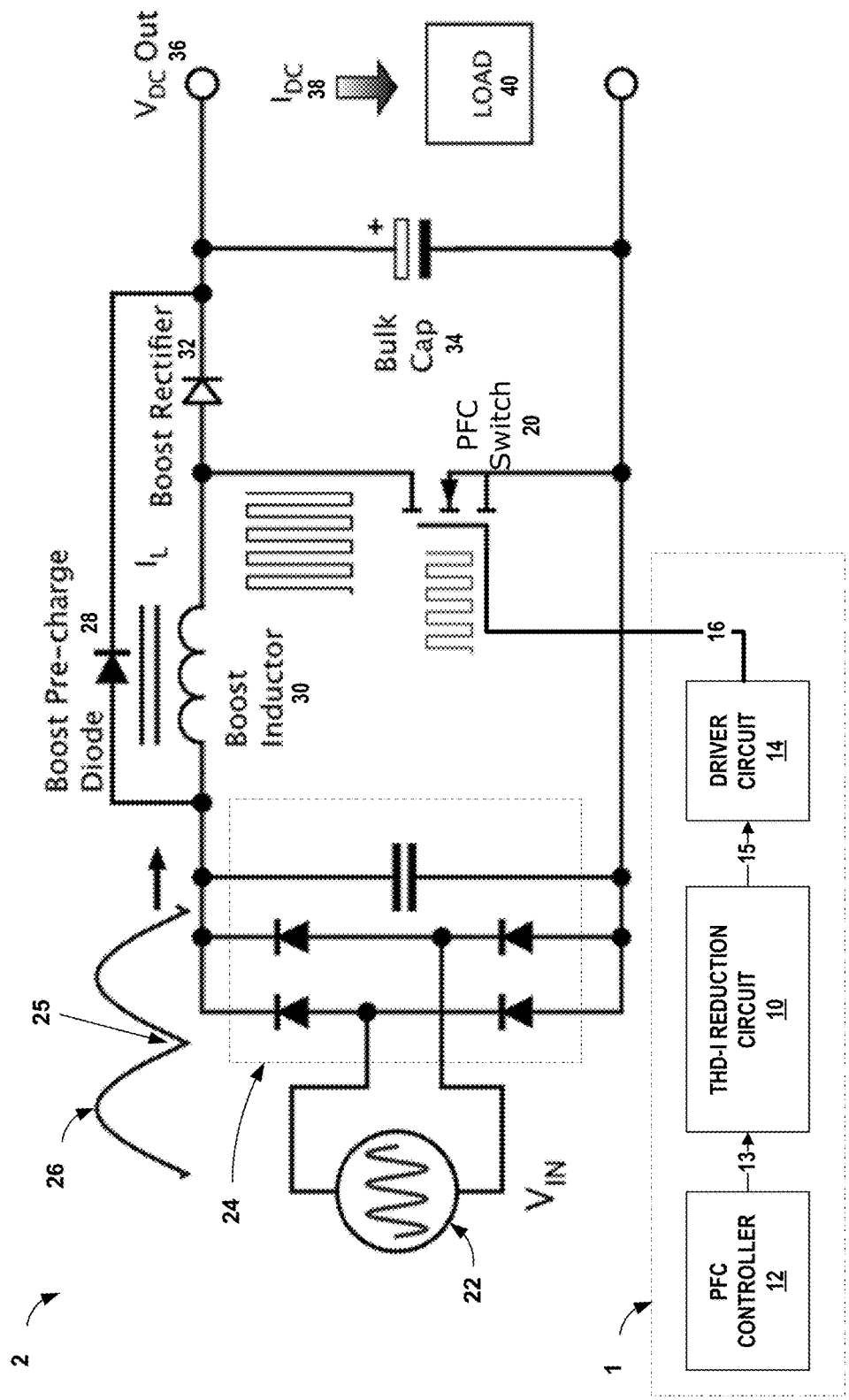
FIG. 1B is a diagram illustrating PFC stage controller circuit connected to an example PFC stage.

FIG. 1B is a diagram illustrating PFC stage controller circuit connected to an example PFC stage. Example PFC stage 2 is just one example of a PFC stage, described herein for illustration purposes only. PFC stage controller circuit 1, which includes THDi reduction circuit 10, may also function with other examples of a PFC stage.

PFC stage 2 is a boost converter that may function as a resistive load to AC input signal 22. PFC stage 2 may include filtering features, as well as other features, such as to ensure PFC stage 2 generates a current reference that is synchronized to AC input signal 22.

PFC stage 2 includes PFC switch 20, rectification circuit 24, boost pre-charge diode 28, boost inductor 30, boost rectifier 32, and bulk capacitor 34. PFC stage 2 outputs a DC voltage $V_{DC\text{-}out}$ 36 with DC output current $I_{DC}$ 38 to load 40. As described above, load 40 may be a heavy load or a light load. Some features of PFC stage 2 will not be described in detail as PFC stage 2 is just one example of a PFC stage that may be controlled by PFC stage controller circuit 1, which includes THDi reduction circuit 10.

The output of rectification circuit 24 is rectified signal 26. The portion of rectified signal 26 indicated by item 25 corresponds to a zero-crossing point of input signal 22. Input signal 22 may be from an AC power source, such as line voltage from the power grid, voltage from a portable generator and similar AC power sources.

As described above in relation to FIG. 1A, THDi reduction circuit 10 may extend the duty cycle or limit the duty cycle of control signal 13. As described in more detail below, THDi reduction circuit 10 may modify control signal 13, particularly at the zero-crossing points 25 of input signal 22.

Driver circuit 14 may receive modified control signal 15 and output driver signal 16 to PFC switch 20. In some examples PFC switch 20 may be a field effect transistor (FET). PFC switch 20 may be configured to turn on based on a logical high or low signal, depending on the configuration of PFC stage 2. In some examples, a PFC switch 20 may be configured to turn on when receiving, for example, a logical high, logical low, or a negative voltage output from driver circuit 14. In some examples, PFC switch 20 may be implemented with NMOS or PMOS, depending on the configuration of the other components of PFC stage 2. In other words, the implementation of PFC stage 2 is just one example of a PFC stage, and driver circuit 14, and other components of PFC stage controller circuit 1, may be configured to be compatible with the PFC stage. The operation of PFC stage controller circuit 1 and THDi reduction circuit 10 will be described in more detail below in relation to FIGS. 6-9B.

Figure 2:
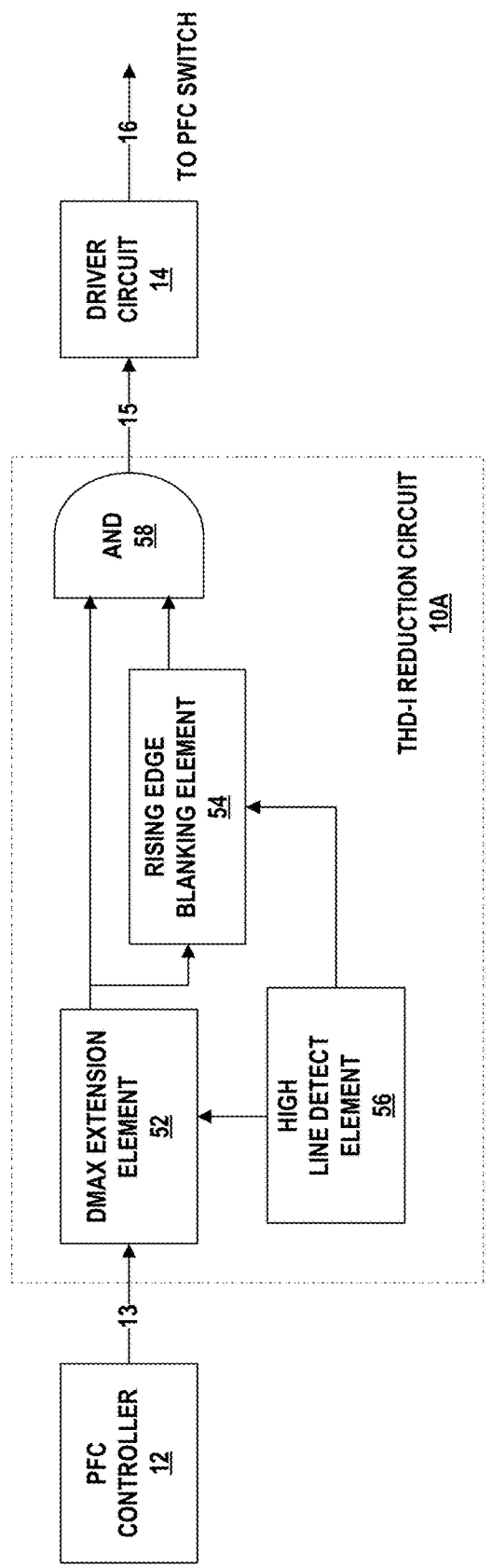
FIG. 2 is a block diagram illustrating an example THDi reduction circuit, according to one or more techniques of this disclosure.

FIG. 2 is a block diagram illustrating an example THDi reduction circuit, according to one or more techniques of this disclosure. THDi reduction circuit 10A corresponds to THDi reduction circuits 10 and 10B-10C as depicted in FIGS. 1A, 1B, and 3-4 and includes similar features and functions. PFC controller 12 and driver circuit 14 performs the same functions as described above in relation to FIGS. 1A-1B, including outputting driver signal 16 to a PFC switch, such as PFC switch 20.

THDi reduction circuit 10A includes DMAX extension element 52, rising edge blanking element 54 and AND gate 58. THDi reduction circuit 10A also includes a sensing element, high line detect element 56, which signals DMAX extension element 52 and rising edge blanking element 54 when high line detect element determines the input signal, such as input signal 22 depicted in FIG. 2, is a high voltage AC input signal. Logical AND gate 58 combines the outputs of DMAX extension element 52 and rising edge blanking element 54 and outputs modified control signal 15 to driver circuit 14.

DMAX extension element 52 is coupled to PFC controller 12 and receives control signal 13 from PFC controller 12. As described above, PFC controller 12 may have certain limitations that may cause control signal 13 to introduce THDi. DMAX extension element 52 is configured to adjust a duty cycle of one or more switching cycles of control signal 13. Control signal 13 may be a PWM control signal as described above. For the first operating condition, a low voltage AC input signal voltage with a heavy load, DMAX extension element 52 may adjust the duty cycle by extending the duty cycle of the one or more switching cycles. In the second operating condition, a high voltage AC input signal with a light load, the DMAX extension element is configured to make no adjustment to the duty cycle of control signal 13. In other words, in some examples, the duty cycle extension features of DMAX extension element 52 may be disabled for a high voltage AC input signal.

For an AC input signal, near zero-crossing points, the input voltage of the AC input signal is small. To keep the output current of the PFC stage synchronized with the output voltage, a maximum duty cycle (DMAX) of control signal 13 is desirable. A DMAX of 100% when the AC input signal is close to the zero-crossing region may yield ideal synchronization. If the DMAX of PFC controller 12 is limited by component limitations, clock speed limitations or other non-ideal, practical limitations there may be a limit on the energy delivered. Therefore, the inductor current (e.g. boost inductor 30 depicted in FIG. 1B) may need more switching cycles until the inductor output current tracks the commanded current. The additional switching cycles may cause an induced time delay, which may in turn cause the line current to be shifted and less synchronized with the line voltage. Consequently, when the current and voltage are less synchronized, this may introduce undesired harmonics of the line frequency (e.g. 50 Hz or 60 Hz) and THDi is higher.

Although for ideal synchronization, maximum duty cycle from control signal 13 is desired as mentioned above, an extended period of very high DMAX may not be desired for other reasons. In one example, a duty cycle that stays at 100% for a number of switching cycles may cause high inductor current and possible damage to the PFC switch, which in some examples may be a FET. Also, in PFC converters with current sensing transformers, there is a minimum off-time that is may be needed for the current sensing transformer to reset. Therefore, if DMAX is ~100%, then the current sensing transformer magnetic flux may not reset, which may result in an offset or an error in the current sense measurement. An inaccurate or offset current sense measurement may result in the line current not being shaped correctly, consequently result in higher THDi.

For the first operating condition of low voltage AC input signal and heavy load, extending the DMAX may therefore improve synchronization, but may cause other problems, such as damage or failure to reset, as described above. Therefore, THDi reduction circuit 10A of this disclosure may extend the duty cycle of control signal 13 from PFC controller 12 by a certain fixed time. In other words, extending the duty cycle of control signal 13 by a predetermined amount of on-time. The predetermined amount of on-time may be set, for example by determining an expected worst case minimum DMAX value possible in manufacturing for a production lot of PFC controllers. THDi reduction circuit 10A may also be configured to blank the rising edge a switching cycle that follows an extended switching cycle. THDi reduction circuit 10A may also be configured to set a predetermined off-time, e.g. fixed blanking time, designed to guarantee a minimum off-time.

Rising edge blanking element 54 is operatively coupled to DMAX extension element 52. In the example of the first operating condition rising edge blanking element 54 is configured to blank the rising edge of a switching cycle that follows a switching cycle that DMAX extension element 52 has extended for a predetermined off-time. In other words, DMAX extension element 52 is configured to adjust a duty cycle of a first switching cycle of control signal 13 in the first operating condition by extending the duty cycle of the first switching cycle. Rising edge blanking element 54 receives signals from DMAX extension element 52 and is configured to blank the rising edge of a second switching cycle of the control signal. The second switching cycle is the next switching cycle subsequent to the first switching cycle. As a result, rising edge blanking element 54 causes modified control signal 15 to include at least a predetermined off-time.

Rising edge blanking element 54 applies to circuits in which ON is a logical high (e.g. 5V) and OFF is a logical low (e.g. approximately zero). The techniques of this disclosure apply equally to circuits with the opposite logic, e.g. OFF is a logical high. In other words, the examples in this disclosure focus on a logical high signal as "on" and logical low signal as "off," however in other examples, the techniques of this disclosure apply to logical high signal as "off" and logical low signal as "on." In such examples, the "rising edge blanking element" may be considered a "falling edge blanking element."

THDi reduction circuit 10A includes high line detect element 56, which is operatively coupled to the DMAX extension element, the rising edge blanking element and the AC input signal, such as input signal 22 depicted in FIG. 1B. High line detection element 56 is configured to determine whether the AC input signal is a high voltage AC input signal. In some examples, high line detect element 56 determines whether the voltage in the AC input signal exceeds a voltage threshold. For example, the voltage threshold may be set to approximately 180 V. A voltage less than the voltage threshold, for example for PFC stage controller circuit used in Japan or the United States, at 115V, high line detect element 56 may determine the AC input signal does not exceed the voltage threshold and is a low voltage AC input signal. For a PFC stage controller circuit in Europe at 230V, high line detect element 56 may determine the AC input signal exceeds the voltage threshold and is a high voltage AC input signal.

In response to determining that the voltage in the AC input signal exceeds the voltage threshold, high line detection element 56 may be configured to cause rising edge blanking element 54 to adjust the duty cycle of control signal 13 by limiting the duty cycle of the first switching cycle and the second switching cycle, described above. In this manner, rising edge blanking element 54 may be operate both in the first operating condition and in the second operating condition, i.e. a high voltage AC input signal with a light load.

As described above, PFC controller 12 may output control signal 13 at DMAX near the zero-crossing regions of the AC input signal. In the second operating condition, a high duty cycle and control loop delay may cause control signal 13 to output one or more switching cycles at DMAX, right after the zero-crossing point. In some examples, for a high voltage AC input signal, switching cycles at DMAX right after zero-crossing may causing a current spike. This current spike may occur at any load condition but the current spike impact on THDi may be worse at light load because the fundamental harmonic amplitude is low and is vulnerable to other harmonic distortion.

However, for a high voltage AC input signal, a large DMAX in control signal 13 may not be needed to maintain good synchronization between the voltage and current. Therefore, to avoid the current spike in the second operating condition, high line detection element 56 may be configured to cause rising edge blanking element 54 to clamp or limit the duty cycles of one or more switching cycles, particularly in the zero-crossing region of the AC input signal. In other words, in response to determining that the AC input signal exceeds the voltage threshold, THDi reduction circuit 10A adjusts the duty cycle of a control signal by setting the on-time of the control signal to be no more than a threshold on-time.

Figure 3:
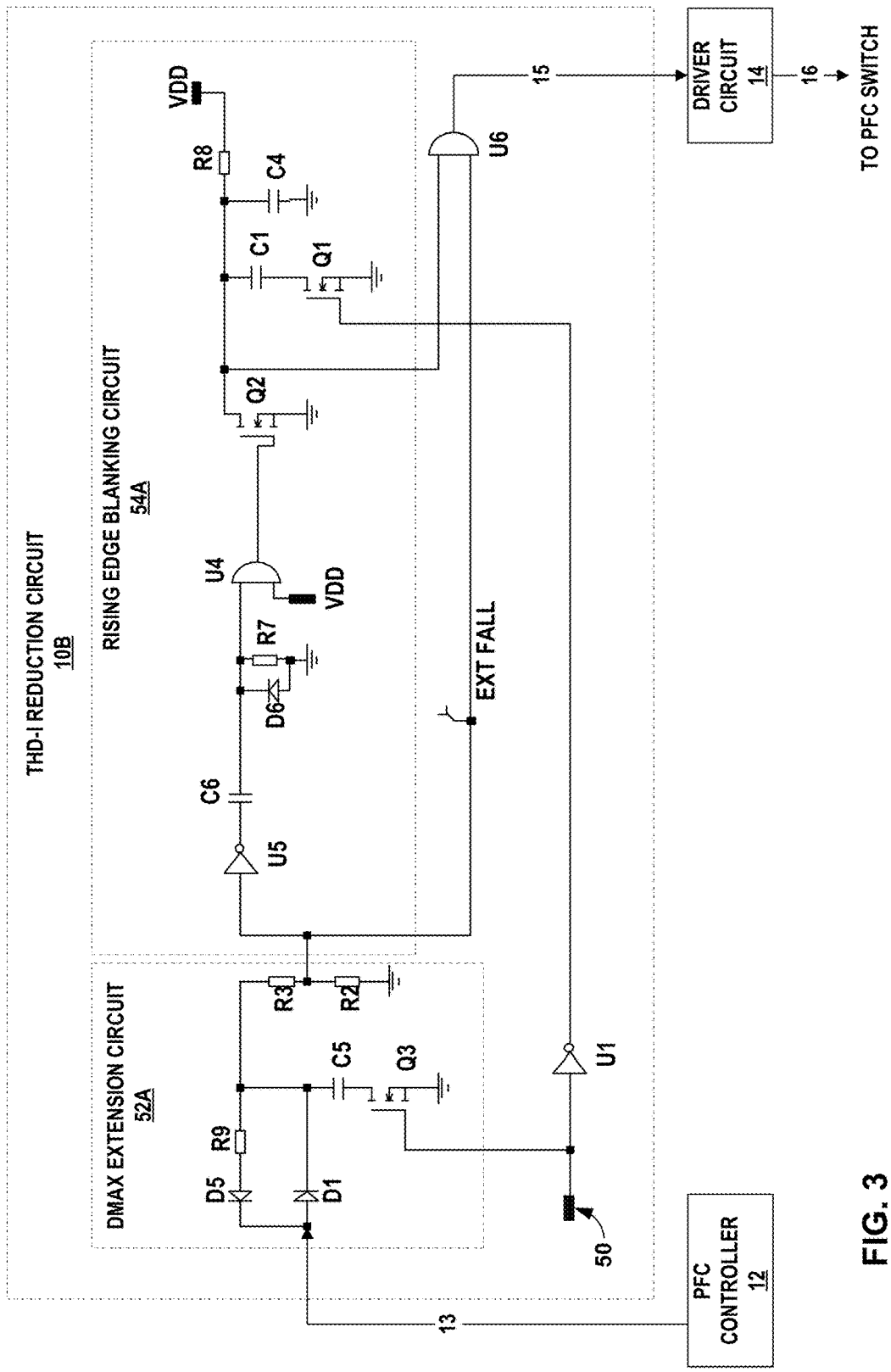
FIG. 3 is a schematic diagram illustrating an example analog implementation of a THDi reduction circuit according to one or more techniques of this disclosure.

FIG. 3 is a schematic diagram illustrating an example analog implementation of a THDi reduction circuit according to one or more techniques of this disclosure. PFC controller 12 and driver circuit 14 performs the same functions as described above in relation to FIGS. 1A-2, including outputting driver signal 16 to a PFC switch.

THDi reduction circuit 10B includes DMAX extension circuit 52A, rising edge blanking circuit 54A, logical AND gate U6 and high line detect input terminal 50. DMAX extension circuit 52A and rising edge blanking circuit 54A perform the same functions as DMAX extension element 52 and rising edge blanking element 54 described above.

DMAX extension circuit 52A receives control signal 13 into the anode of diode D1 and the cathode of diode D5. The anode of diode D5 connects to resistor R3 through resistor R9. The cathode of diode D1 connects to a node connecting capacitor C5, resistor R9 and resistor R3. Capacitor C5 connects to the drain of n-channel FET Q3. The source of FET Q3 connects to ground. The gate of FET Q3 connects to high line detect input terminal 50. A high line detect element, such as high line detect element 56 is not shown in FIG. 3, however high line detect input terminal 50 is configured to connect to the output of a high line detect element, in this example. Resistor R3 connects to ground through resistor R2 and forms a voltage divider. The node between resistor R3 and resistor R2 is the output of DMAX extension circuit 52A, which connects to one input of rising edge blanking circuit 54A.

Rising edge blanking circuit 54A receives the output of DMAX extension circuit 52A into the input of inverter U5. The output of inverter U5 connects to a first input of AND gate U4 through capacitor C6. The first input of AND gate U5 also connects to ground through resistor R7 and connects to the cathode of diode D6. The anode of diode D6 connects to ground.

The second input of AND gate U4 connects to VDD in the example of FIG. 3. The output of AND gate U4 controls the gate of n-channel FET Q2. The drain of Q2 connects to capacitor C1, capacitor C4 and resistor R8 as well as a first input of output AND gate U6. The second input of AND gate U6 connects to the output of DMAX extension circuit 52A. AND gate U6 provides a similar function to AND gate 58 depicted in FIG. 2.

The drain of FET Q2 connects to VDD through resistor R8. The drain of n-channel FET Q1 connects to the drain of FET Q2 through capacitor C1. The source of FET Q1 connects to ground. The gate of FET Q1 connects to the output of inverter U1 while the input of inverter U1 connects to high line detect input terminal 50.

In operation, in response to determining that the voltage in the AC input signal does not exceed the voltage threshold, the high line detection element output a signal to high line detect input terminal 50, which causes the DMAX extension element to adjust the duty cycle by extending the duty cycle of a first switching cycle of control signal 13. The same signal passes through inverter U1 and disables the DMAX limiting (aka clamping) features of rising edge blanking circuit 54A.

As described above in relation to FIG. 2, rising edge blanking circuit 54A is configured to blank the rising edge of a second switching cycle of control signal 13. The second switching cycle is the next switching cycle subsequent to the first switching cycle, and the rising edge blanking element causes modified control signal 15 to include at least a predetermined off-time. DMAX extension circuit 52A may extend the second switching cycle for a predetermined on-time, and rising edge blanking circuit 54A may blank a third switching cycle subsequent to the second switching cycle.

Rising edge blanking circuit 54A is configured such that the predetermined off-time is configured to start at substantially the same time as the end of the first switching cycle. In other words, rising edge blanking circuit 54A begins the predetermined off-time at the end of the extension of the previous switching cycle. This process of extending the duty cycle of a switching cycle and blanking the following switching cycle may continue for several iterations, as will be described further in relation to FIG. 6 below.

In the example of a high voltage AC input signal, high line detect input terminal 50 may receive a signal that disables the DMAX extension features of DMAX extension circuit 52A. The signal passes through inverter U1 and enables the DMAX clamping or limiting features of rising edge blanking circuit 54A. In other words, the high line detection element causes rising edge blanking circuit 54A to limit the duty cycle of one or more switching cycles of control signal 13.

The values for the predetermined on-time and predetermined off-time may be set for THDi reduction circuit 10B by selecting the values of the components in THDi reduction circuit 10B. For example, selecting the values of capacitor C5 and resistor R9 may set the predetermined DMAX extension on-time of a switching cycle. Similarly, selecting the values of capacitor C4 and resistor R8 may determine the blanking time (aka off-time) for a switching cycle. Selecting the values of analog components in a high line detect element (not shown in FIG. 3) may determine a voltage threshold between a high voltage AC input signal and a low voltage AC input signal. Selecting values of other components in rising edge blanking circuit 54A, such as capacitor C1, capacitor C4 and resistor R8 may determine the DMAX clamping value for a high voltage AC input signal.

Figure 4:
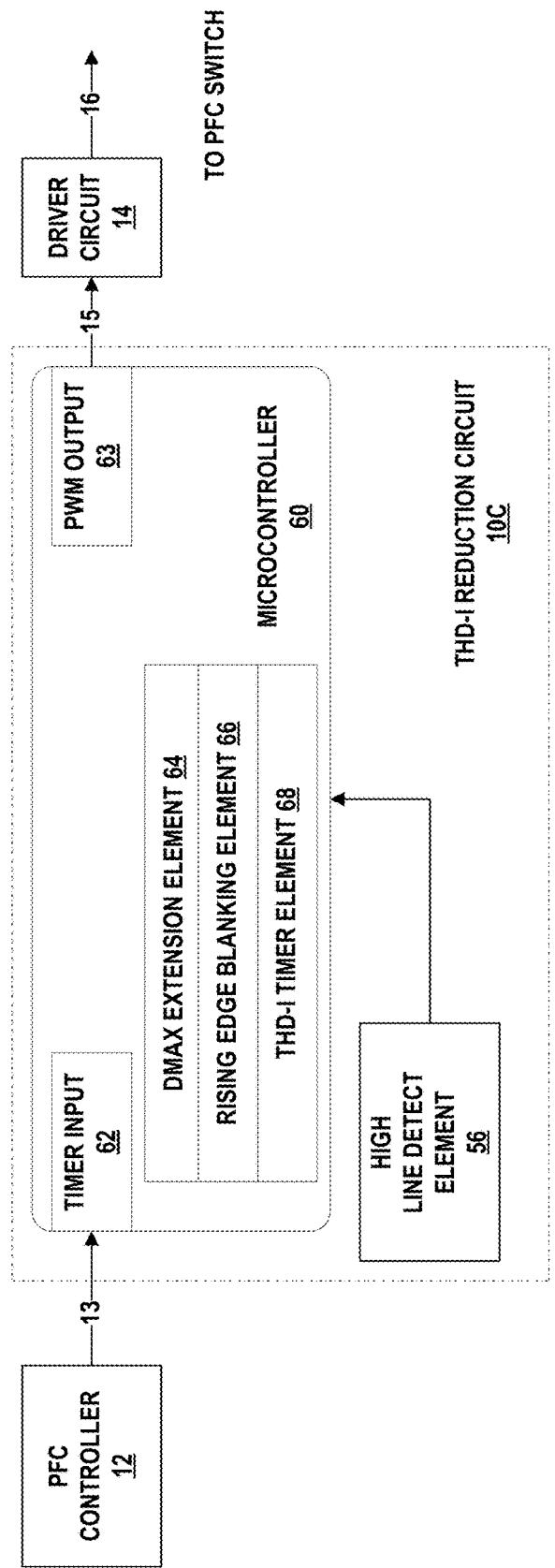
FIG. 4 is a block diagram illustrating an example THDi reduction circuit implemented with a microcontroller, in accordance with one or more techniques of this disclosure.

FIG. 4 is a block diagram illustrating an example THDi reduction circuit implemented with a microcontroller, in accordance with one or more techniques of this disclosure. In operation, THDi reduction circuit 10C may function similar to THDi reduction circuits 10-10B described above. PFC controller 12 and driver circuit 14 performs the same functions as described above in relation to FIGS. 1A-1B, including outputting driver signal 16 to a PFC switch.

THDi reduction circuit 10C includes microcontroller 60 and high line detect element 56. High line detect element 56 performs the same functions as described above in relation to FIGS. 2 and 3. Elements of THDi reduction circuit 10C may be implemented with analog circuitry, logic blocks, or digital circuitry in any combination.

Microcontroller 60 may include timer input 62, PWM output 63, DMAX extension element 64, rising edge blanking element 66, THDi timer element 68. Microcontroller 60 may include timers, control lines, input and output elements and other features to perform the features of THDi reduction circuit 10C, as described elsewhere in this disclosure.

Examples of microcontroller 60 may include, any type of digital processing circuitry, including one or more of a microprocessor, a controller, a microcontroller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Microcontroller 60 may receive control signal 13, similar to the other examples of THDi reduction circuits described above, into timer input 62. Microcontroller 60 may output modified control signal 15, which may be a PWM signal, through PWM output 63 to driver circuit 14.

DMAX extension element 64 and rising edge blanking element 66 perform the same functions as described above in relation to FIGS. 1A-3 above. In the example of microcontroller 60, DMAX extension element 64 and rising edge blanking element 66 may be implemented by any combination of analog or digital circuitry.

THDi timer element 68 may include timers that set the DMAX and off-time parameters values depending on input line conditions of the AC input signal, such as input signal 22 depicted in FIG. 1B. In other words, THDi timer element 68 may be operatively coupled to DMAX extension element 64 and rising edge blanking element 66. THDi timer element 68 may be configured to set an amount of extension time for the DMAX extension element to extend the duty cycle of the first switching cycle. THDi timer element 68 may also be configured to set an amount of blanking time for the rising edge blanking element to blank the rising edge of the second switching cycle.

THDi timer element 68 may be implemented by any combination of analog or digital circuitry. An analog implementation sets the values for either low or high AC input signal conditions, as described above in relation to FIG. 3. A digital implementation may result in settings that are more granular and adaptive to line and load conditions when compared to an analog implementation. In some examples, more adaptive digital implementation may result in better THDi performance than analog implementation.

As one example for non-limiting illustration purposes, a low voltage AC input signal in the first operating condition, an analog implementation for DMAX extension may set a fixed DMAX extension of two percent. In the example of a PFC controller 12 limited, for example by component tolerances, to a 95% DMAX, the analog implementation of two percent would extend DMAX to 97%. A digital implementation may include more granular features to the extend DMAX by the two percent under a first load condition, three percent under a second load condition and one percent under a third load condition.

Figure 5:
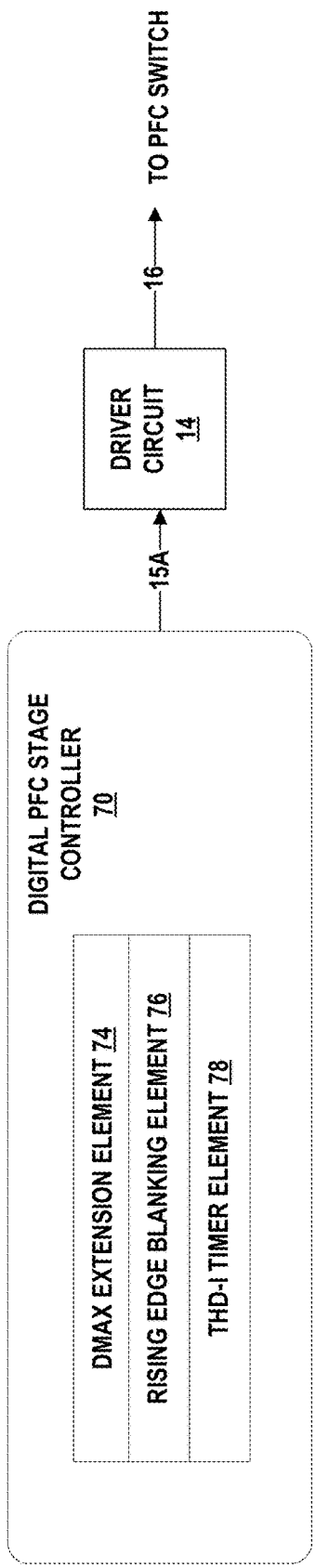
FIG. 5 is a block diagram illustrating a digital PFC stage controller circuit implementation with the THDi reduction features in accordance with one or more techniques of this disclosure.

FIG. 5 is a block diagram illustrating a digital PFC stage controller circuit implementation with the THDi reduction features in accordance with one or more techniques of this disclosure. Driver circuit 14 performs the same functions as described above including outputting driver signal 16 to a PFC switch of a PFC stage.

Digital PFC stage controller circuit 70 may include DMAX extension element 74, rising edge blanking circuit 76 and THDi timer element 78, which perform the same functions as described above in relation to FIG. 4. Also, as described above, the elements of digital PFC stage controller circuit 70 may be implemented by any combination of digital or analog circuitry.

In some examples, digital PFC stage controller 70 may include one or more processors, which may be any type of digital processing circuitry as described above in relation to FIG. 4. In some examples, the digital processing circuitry may be operatively coupled to one or more non-transient computer-readable storage medium elements. The computer-readable storage medium may include instructions, such as programming language, data and settings, that may be executed by the digital processing circuitry to perform the DMAX extension, blanking of the rising edge and DMAX limiting features of the THDi reduction circuit described above.

Figure 6:
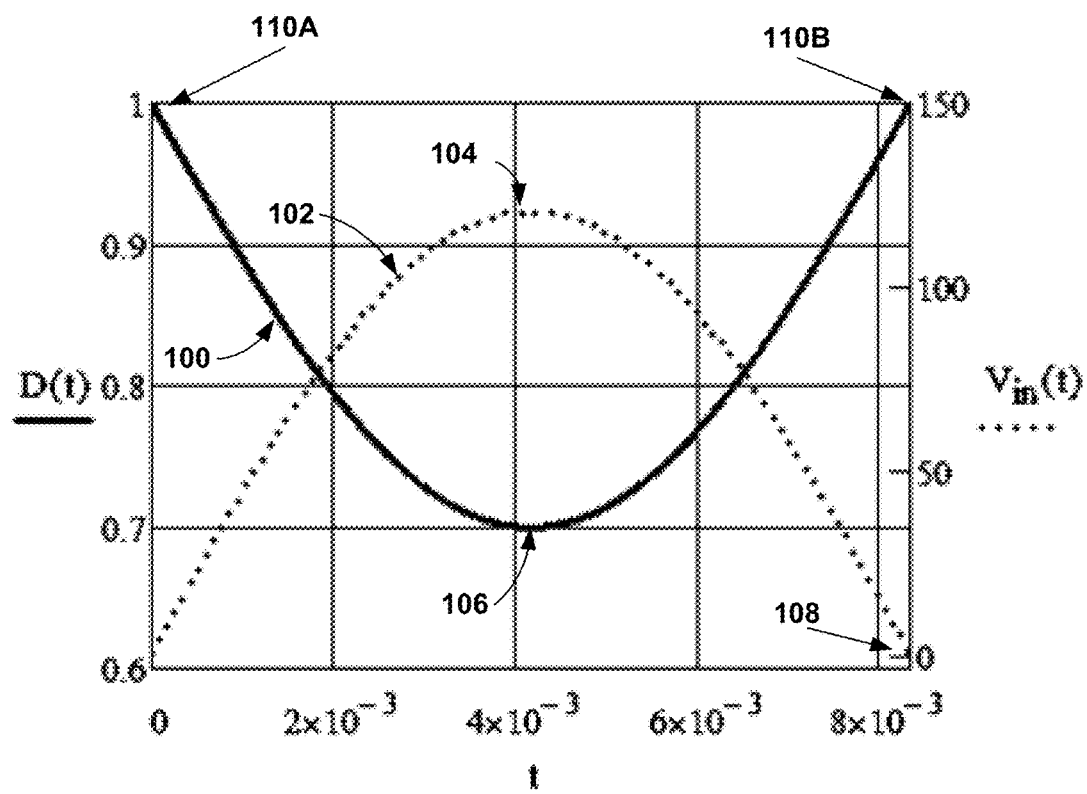
FIG. 6 is a graph illustrating an example the relationship between duty cycle and the voltage of the AC input signal.

FIG. 6 is a graph illustrating an example the relationship between duty cycle and the voltage of the AC input signal. The graph of FIG. 6 may apply to PFC stage controller circuits with or without a THDi reduction circuit The solid curve 100 indicates the changes in duty cycle over time D(t) as the AC input voltage Vin(t) changes over time for one half-cycle of an AC input voltage sinusoid. The dotted curve 102 indicates Vin(t).

Points 110A and 110B indicate regions in which the duty cycle nears unity, or 100% when the voltage of the AC input signal is low, such as near a zero-crossing region 108. When the AC input signal V(t) is at its peak, e.g. at point 104, the duty cycle D(t) is at its minimum 106.

For AC-DC converters, or other AC circuits with a PFC stage, such as PFC stage 2 depicted in FIG. 1B, the PFC controller, such as PFC controller 12, may output control signal 13 with duty cycle near the maximum duty cycle that the PFC controller is capable of outputting, e.g. DMAX to more closely synchronize the current and voltage. For AC-DC converters with a high voltage AC input signal, a PFC controller that outputs a control signal near DMAX may cause a current spike near the zero-crossing point, especially under light load conditions and increase THDi. Therefore, the THDi reduction circuit of this disclosure may limit the DMAX under a high voltage AC input signal operating conditions.

FIGS. 7A-7C are timing graphs illustrating DMAX extension and rise time blanking for some examples of PFC controllers, in accordance with one or more techniques of this disclosure. Each of the examples of FIGS. 7A-7C illustrate the effect of the THDi reduction circuit on the falling edge of a first switching cycle and the blanking of a second switching cycle while operating under the first condition. The first condition is a low voltage AC input signal and a heavy output load. In all three examples 7A-7C, the THDi reduction circuit is configured for a DMAX of 97% by setting a two percent DMAX extension and a three percent off-time blanking.

As described above, though FIGS. 7A-7C depict an example of a "falling edge" being the end of the on-time, or duty cycle of the control signal, in other examples, a rising edge may be the end of a duty cycle. In other words, the examples in this disclosure focus on a logical high signal as "on" and logical low signal as "off," however in other examples, the techniques of this disclosure apply to logical high signal as "off" and logical low signal as "on." In such examples, the "rising edge blanking element" may be considered a "falling edge blanking element."

FIG. 7A depicts the output of a PFC controller, PFC controller A, capable of a DMAX of 97%. PFC A controller output 162A corresponds to control signal 13 from PFC controller 12 described above. The falling edge the first switching cycle of the controller output signal is at 97% and the rising edge of the controller output signal is at 100%. This is also zero percent time point of the second switching cycle.

The "2% DMAX Extension" graph 164A of example 7A corresponds to the DMAX extension element output to AND gate 58, described above. As shown in example 7A, the DMAX extension element of the THDi reduction circuit is configured to extend the duty cycle of the first switching cycle by two percent. Therefore, the falling edge of the modified control signal extends by two percent beyond 97% DMAX to result in a 99% duty cycle.

The "3% off-time blanking" curve 168A depicts the effect of a rising edge blanking element, which corresponds to the rising edge extension element output to AND gate 58 as depicted in FIG. 2. The rising edge output element is configured to begin a three percent off-time at the end of the extended first switching cycle 172. In an analog example, such as the analog implementation of FIG. 3, the predetermined three percent off-time may be configured by selecting the values of resistors and capacitors in the rising edge blanking element. In a digital example, the three percent off-time may be configured by instructions in the computer readable storage media, as one example. In either example, the three percent blanking time results in blanking the rising edge of the PFC A controller output and the DMAX extension output at AND gate 58 (see FIG. 2).

The output of AND gate 58 is modified control signal 15. The combination of inputs to AND gate 58, i.e. the two percent DMAX extension signal and the three percent off-time blanking signal, results in the modified control signal output rising edge begins three percent after the extended falling edge 174. Therefore, for a THDi reduction circuit configured for a DMAX of 97% when connected to a PFC controller that capable of a DMAX of 97%, the modified control signal output from the THDi reduction circuit is 97%. In other words, the addition of the THDi reduction circuit to the PFC stage controller circuit will output a 97% DMAX modified control signal even with a PFC controller input with a DMAX capability of 97%.

FIGS. 7B and 7C operate in a similar manner to the example of FIG. 7A. FIG. 7B illustrates a PFC controller capable of a DMAX of 96% connected to a THDi reduction circuit configured the same as in FIG. 7A above. PFC B controller 162B outputs the falling edge the first switching cycle of the controller output signal at 96% and the rising edge of the controller output signal at 100%. The DMAX extension element of the THDi reduction circuit is configured to extend the duty cycle of the first switching cycle by two percent. Therefore, the falling edge of the modified control signal extends by two percent beyond 96% DMAX to result in a 98% duty cycle 172B. The DMAX extension element outputs its signal to an AND gate, such as AND gate 58.

The rising edge output element is configured to begin a three percent off-time at the end of the extended first switching cycle 172B. The three percent blanking time results in blanking the rising edge of the PFC A controller output and the DMAX extension output at AND gate 58. The combination of inputs to AND gate 58, results in the modified control signal output rising edge begins three percent after the extended falling edge 172B. Therefore, for a THDi reduction circuit configured for a DMAX of 97% when connected to a PFC controller that capable of a DMAX of 96%, the modified control signal output from the THDi reduction circuit is 97%.

Example 7C illustrates a PFC controller capable of a DMAX of 95% connected to a THDi reduction circuit configured the same as in examples 7A-7B above. PFC C controller outputs the falling edge the first switching cycle of the controller output signal at 95% and the rising edge of the controller output signal at 100%. The DMAX extension element of the THDi reduction circuit is configured to extend the duty cycle of the first switching cycle by two percent 172C. Therefore, the falling edge of the modified control signal extends by two percent beyond 95% DMAX to result in a 97% duty cycle.

The rising edge output element is configured to begin the three percent off-time at the end of the extended first switching cycle 172C. The three percent blanking time results in blanking the rising edge of the PFC A controller output and the DMAX extension output at AND gate 58. The combination of inputs to AND gate 58, results in the modified control signal output rising edge 174B begins three percent after the extended falling edge 172C. Therefore, for a THDi reduction circuit configured for a DMAX of 97% when connected to a PFC controller that capable of a DMAX of 95%, the modified control signal output from the THDi reduction circuit is 97%.

In some examples, a PFC controller outputs a PWM control signal that is input to the DMAX extension circuit, where the control signal's falling edge is delayed. The resultant signal, with extended DMAX, is fed to the rising edge blanking circuit. This will assure a fixed off-time following the delayed falling edge. The high line detect circuit is used to disable the DMAX extension function for a high voltage AC input signal and also to increase the rising edge blanking function to limit the DMAX value. FIG. 6 illustrates that DMAX and off-time can be fixed regardless of the PFC controller output variation.

FIGS. 8A-8C are graphs illustrating the operation of a PFC stage controller circuit for a low voltage AC input signal, such as may be seen on an oscilloscope. FIGS. 8A-8C illustrate the operation of a PFC stage controller without a THDi reduction circuit.

FIG. 8A illustrates several voltage cycles of the AC input voltage. Rectified AC input signal 158A corresponds to rectified input signal 26 depicted in FIG. 1B. Measured duty cycle 150A depicts how the duty cycle increases as rectified AC input signal 158A decreases near zero-crossing points 25, similar to that described above for FIGS. 1A and 5. Inductor current 152A, corresponds to the output of a PFC stage inductor, such as boost inductor 30, depicted in FIG. 1B. Inductor current 152A is close in shape to rectified AC input signal 158A and smooth in the zero-crossing region. Gate voltage 156A is the control voltage at the gate of a PFC switch, such as PFC switch 20 depicted in FIG. 1B. Gate voltage 156A corresponds to driver signal 16. Drain voltage 154A is the voltage across a PFC switch, such as PFC switch 20 depicted in FIG. 1B.

FIG. 8B is a graph illustrating a zoomed in portion of the graph of FIG. 8A. As with FIG. 8A, FIG. 8B includes plots that correspond to similar plots described above. These include rectified AC input signal 158B, measured duty cycle 150B, inductor current 152B, gate voltage 156B and drain voltage 154B.

FIG. 8C is a graph illustrating a zoomed in area of FIGS. 8A and 8B near the zero-crossing region of the AC input signal. FIG. 8C includes rectified AC input signal 158C, measured duty cycle 150C, inductor current 152C, gate voltage 156C and drain voltage 154C.

FIGS. 8A-8C illustrate how measured duty cycle 150A-150B is maximized near the zero-crossing region of the AC input signal, as illustrated in FIG. 6, causing the drain voltage 154A-154C to decrease near the zero-crossing region of the AC input signal (160). Inductor current 152A-152C is in synchronization with rectified AC input signal 158A-158C and does not show current spikes near the zero-crossing points 25.

Figure 9B:
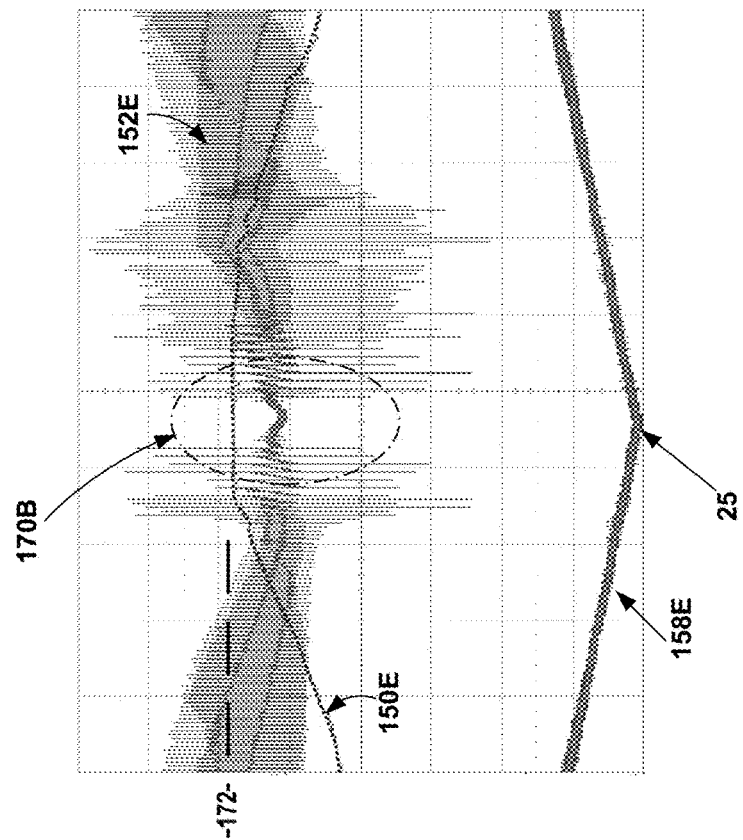
FIG. 9B is a graph illustrating the operation of a PFC stage controller that includes a THDi reduction circuit and receives a high voltage AC input signal.
Figure 9A:
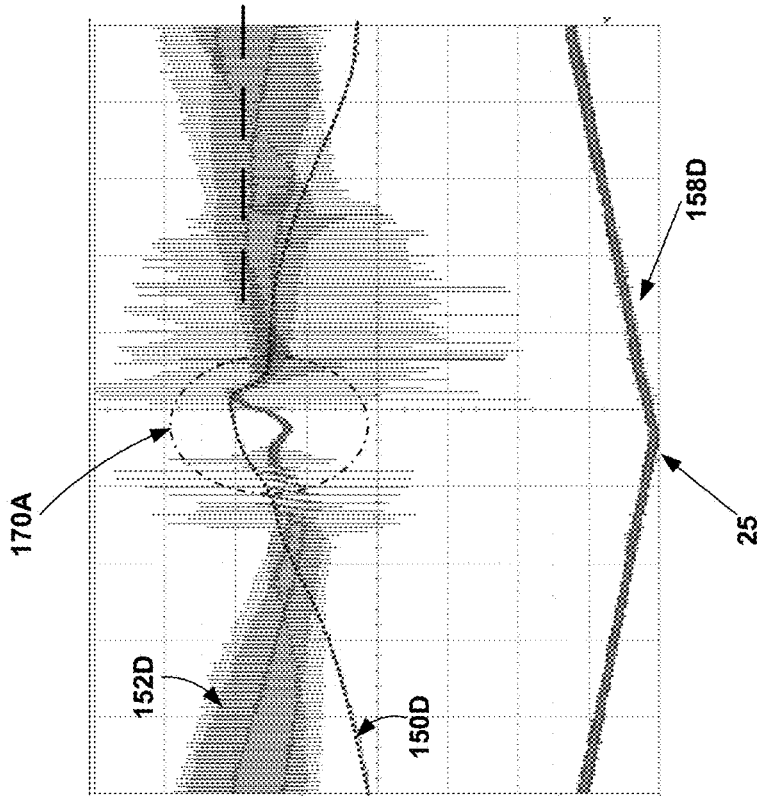
FIG. 9A is a graph illustrating the operation of a PFC stage controller without a THDi reduction circuit receiving a high voltage AC input signal.

FIGS. 9A and 9B are graphs illustrating the operation of a PFC stage controller circuit for a high voltage AC input signal, such as may be seen on an oscilloscope. Unlike the graphs in FIGS. 8A-8C, the inductor output indicates a spike near the zero-crossing region.

FIG. 9A is a graph illustrating the operation of a PFC stage controller without a THDi reduction circuit receiving a high voltage AC input signal. FIG. 9A depicts rectified AC input signal 158D, measured duty cycle 150D, and inductor current 152D.

Inductor current 152D has a large current spike near the zero-crossing region (170A). Rectified AC input signal 158D is at a minimum near the zero-crossing region of the AC input signal. In the same zero-crossing region, measured duty cycle 150D is at a maximum, especially near the current spike. As described above, because of high DMAX and control loop delay, the maximum duty cycle in the control signal (e.g. control signal 13) may be seen right after the zero-crossing, causing a current spike, as shown in the FIG. 9A. The impact on THDi from the current spike in inductor current 152D may be worse at light load because the fundamental harmonic amplitude is low and is vulnerable to other harmonic distortion.

FIG. 9B is a graph illustrating the operation of a PFC stage controller that includes a THDi reduction circuit and receives a high voltage AC input signal. Comparing inductor current 152E in FIG. 9B to inductor current 152D in FIG. 9A shows the current spike in the zero-crossing region (170A) is significantly reduced when the THDi reduction circuit is included (170B).

Unlike the graph of FIG. 9A, measured duty cycle 150E does not show a maximum duty cycle right after the zero-crossing point 25 of AC input signal 158E. Instead, the THDi reduction circuit limits or clamps the duty cycle of the control signal near the zero-crossing region, as shown by the plateau shape of measured duty cycle 150E. Limiting the duty cycle for a high voltage AC input signal may reduce the current spike, especially near the zero-crossing region (170B) and may therefore reduce THDi. Note that while the description above of FIGS. 8A-9B has focused on the zero-crossing region, the THDi reduction circuit is active throughout the entire cycle of the AC input signal, not just at the zero-crossing regions.

FIG. 10 is a table illustrating the performance of an example PFC stage controller circuit both with and without a THDi reduction circuit. FIG. 10 illustrates the performance, based on tested results, of two different PFC stage controller circuits, IC#1 and IC#2, without a THDi reduction circuit and the performance with a THDi reduction circuit inserted after the PFC controller, as illustrated in FIGS. 1A-3. FIG. 10 illustrates how variations in the PFC stage controller circuits can be improved by the addition of a THDi reduction circuit.

For a low voltage AC input signal (204), IC#1 without a THDi reduction circuit (202) exceeded the THDi specification when supplying a heavier load. For example, the lighter loads of 5 A and 10 A, THDi of IC #1 was below the THDi specification, i.e. 6.2<13.1 and 5.8<8.6, respectively. However, at higher loads, e.g. 60 A, IC#1 exceeded the THDi specification of 4.2%. However, IC#2 was able to pass the THDi specification at all load levels without a THDi reduction circuit (202). This indicates how variation in the circuits can impact performance. Though not shown in FIG. 10. IC#2 may have had a higher DMAX than IC#1 and was therefore able to synchronize the voltage and current better and therefore introduce less THDi.

For the high voltage AC input signal (206), IC#1 was able to pass the THDi specification at all load levels without a THDi reduction circuit (202). However, IC#2 failed the THDi specification at a light load of 5A by exceeding the THDi specification (11>10.7). As described above in relation to FIGS. 9A and 9B, IC#2 may have had a higher DMAX, which may have resulted in better performance at a low voltage AC input signal, but may have caused a current spike at the high voltage AC input signal and therefore introduced higher THDi.

For both IC#1 and IC #2, adding the THDi reduction circuit improved performance both at both voltage levels and under all load conditions. The addition of a THDi reduction circuit, as shown in the table of FIG. 10, may improve THDi performance across variations in the PFC stage controller circuits. As described above, the THDi reduction circuit may be implemented with any combination of analog circuitry and digital circuitry, and may include one or more processors.

Figure 11:
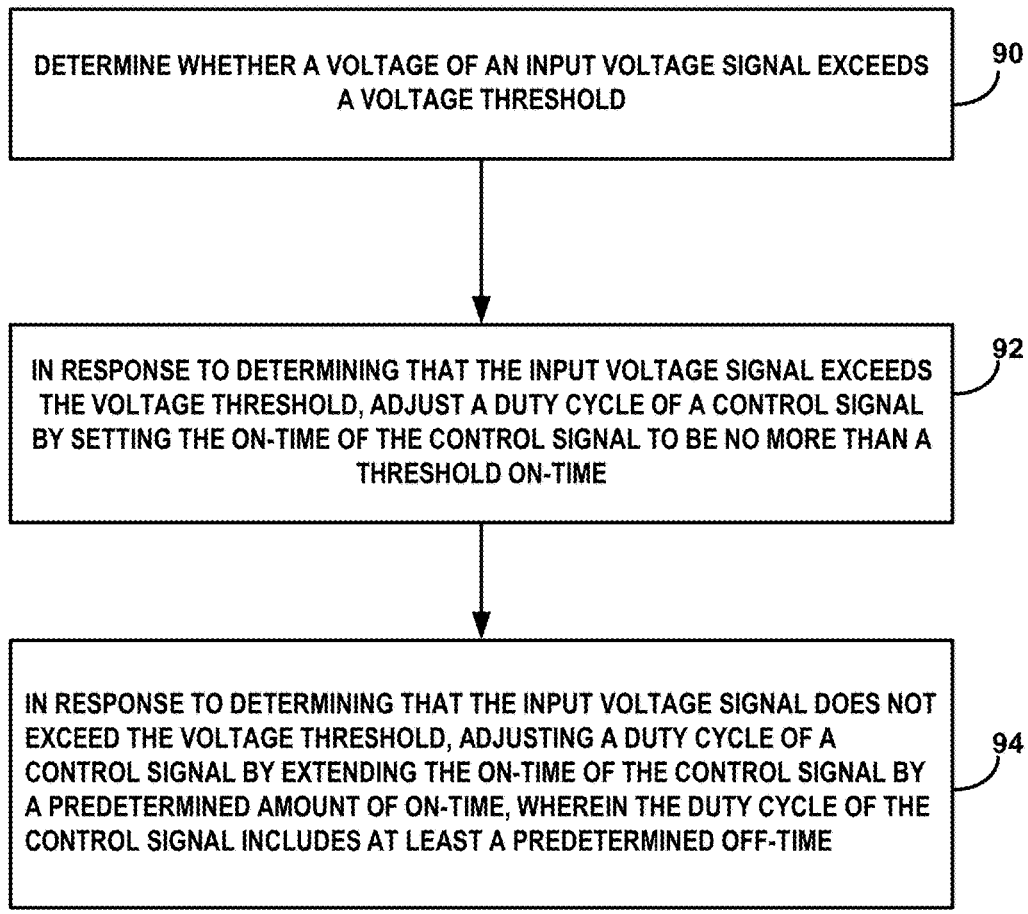
FIG. 11 is a flow chart illustrating an example mode of operation of a THDi reduction circuit, in accordance with one or more techniques of this disclosure.

FIG. 11 is a flow chart illustrating an example mode of operation of a THDi reduction circuit, in accordance with one or more techniques of this disclosure. The flowchart of FIG. 11 will be described in relation to FIGS. 1A-5, unless otherwise noted.

High line detection element 56 of THDi reduction circuit 10A may determine whether the voltage of an AC input signal, such as input signal 22, exceeds a voltage threshold (90). As described above, determining whether the AC input signal exceeds a voltage threshold is just one example technique for determining the voltage level of an AC input signal. In other examples, such described in relation to FIGS. 4 and 5, a THDi reduction circuit may determine voltage level by using processing circuitry following instructions stored at a computer readable storage medium.

In response to determining that the AC input signal exceeds the voltage threshold, THDi reduction circuit 10A may adjust a duty cycle of a control signal 13 by setting the on-time of the control signal to be no more than a threshold on-time (92). In other words, limiting the control signal on-time to be no more than a threshold on-time is equivalent to clamping the duty cycle. As described in relation to FIGS. 9A and 9B, limiting or clamping the duty cycle may reduce a current spike at the inductor output and reduce THDi. THDi reduction circuit 10A may not change control signal 13, rather THDi reduction circuit 10A may take control signal 13 as an input and output a modified control signal 15 that limits the control signal on-time to be no more than a threshold on-time (92).

In response to determining that the AC input signal does not exceed the voltage threshold, DMAX extension element 52 of THDi reduction circuit 10A may adjust the duty cycle of control signal 13 by extending the on-time of the control signal by a predetermined amount of on-time (94). As described in relation to FIGS. 8A-8C, DMAX extension element 52 may extend the duty cycle, i.e. extend the on-time of the control signal by a pre-determined amount of time. In the example of FIGS. 8A-8C, the pre-determined amount of extension time was two percent of the duty cycle.

Rising edge blanking element 54, may ensure the duty cycle of modified control signal 15 includes at least a predetermined off-time (94). In the example of FIGS. 8A-8C, the predetermined off-time was three percent of the duty cycle. In this manner, THDi reduction circuit may avoid damage from excess inductor current and allow for circuits that include a current sensing transformer to reset.

In one or more examples, the functions described above may be implemented in hardware, software, firmware, or any combination thereof. For example, the various components of FIGS. 4 and 5, such as THDi timer element 68 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media, can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein, such as one or more processors in digital PFC stage controller 70 or microcontroller 60, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Example 1

A circuit comprising a maximum duty cycle (DMAX) extension element and a rising edge blanking element operatively coupled to the DMAX extension element, wherein the DMAX extension element is configured to adjust a duty cycle of a first switching cycle of a control signal, and the rising edge blanking element is configured to blank the rising edge of a second switching cycle of the control signal, wherein: the second switching cycle is the next switching cycle subsequent to the first switching cycle, and the rising edge blanking element causes the control signal to include at least a predetermined off-time.

Example 2

The circuit of example 1, further comprising a high line detect element operatively coupled to the DMAX extension element, the rising edge blanking element and a AC input signal, wherein the high line detection element: is configured to determine whether the voltage in the AC input signal exceed a voltage threshold, and in response to determining that the voltage in the AC input signal exceeds the voltage threshold, the high line detection element causes the rising edge blanking element to adjust the duty cycle by limiting the duty cycle of the first switching cycle and the second switching cycle.

Example 3

The circuit of any of examples 1-2 or any combination thereof, wherein in response to determining that the voltage in the AC input signal does not exceed the voltage threshold, the high line detection element causes the DMAX extension element to adjust the duty cycle by extending the duty cycle of the first switching cycle and the second switching cycle.

Example 4

The circuit of any combination of examples 1-3, wherein the predetermined off-time is configured to start at substantially the same time as the end of the first switching cycle.

Example 5

The circuit of any combination of examples 1-4, wherein the off-time is a logical low signal.

Example 6

The circuit of any combination of examples 1-5, wherein the DMAX extension element and the rising edge blanking element are implemented using analog circuit components.

Example 7

The circuit of any combination of examples 1-6, wherein the DMAX extension element and the rising edge blanking element are implemented using a microcontroller.

Example 8

The circuit of any combination of examples 1-7, wherein the DMAX extension element and the rising edge blanking element are implemented using digital processing circuitry.

Example 9

The circuit of any combination of examples 1-8, wherein the circuit further comprises non-transient computer-readable storage medium, wherein the digital processing circuitry is operatively coupled to the computer-readable storage medium and wherein the computer-readable storage medium comprises instructions for the digital processing circuitry.

Example 10

A circuit comprising: a driver circuit, wherein the driver circuit is configured to output a signal to a power factor correction (PFC) stage; a total harmonic distortion (THDi) reduction circuit operatively coupled to the driver circuit, wherein the output of the THDi circuit is configured to regulate the signal output by the driver circuit, the THDi reduction circuit comprising: a maximum duty cycle (DMAX) extension element configured to adjust a duty cycle of a first switching cycle of a control signal; and a rising edge blanking element operatively coupled to the DMAX extension element, wherein: the rising edge blanking element is configured to blank the rising edge of a second switching cycle of the control signal, wherein: the second switching cycle is the next switching cycle subsequent to the first switching cycle, and the rising edge blanking element causes the control signal to include at least a predetermined off-time.

Example 11

The circuit of example 10, further comprising a digital PFC stage controller configured to output the control signal.

Example 12

The circuit of any combination of examples 10-11, wherein further comprising a THDi timer element operatively coupled to the DMAX extension element and the rising edge blanking element, wherein the THDi timer element is configured to set an amount of extension time for the DMAX extension element to extend the duty cycle of the first switching cycle and is configured to set an amount of blanking time for the rising edge blanking element to blank the rising edge of the second switching cycle.

Example 13

The circuit of any combination of examples 10-12, wherein further comprising a PFC controller operatively coupled to the THDi reduction circuit and configured to output the control signal.

Example 14

The device of any combination of examples 10-13, wherein further comprising a high line detect element operatively coupled to the DMAX extension element, the rising edge blanking element and an AC input signal, wherein the high line detection element: is configured to determine whether the voltage in the AC input signal exceeds a voltage threshold, and in response to determining that the voltage in the AC input signal exceeds the voltage threshold, the high line detection element causes the rising edge blanking element to limit the duty cycle of the first switching cycle and the second switching cycle.

Example 15

The device of any combination of examples 10-14, wherein in response to determining that the voltage in the AC input signal does not exceed the voltage threshold, the high line detection element causes the DMAX extension element to adjust the duty cycle by extending the duty cycle of the first switching cycle.

Example 16

The device of any combination of examples 10-15, wherein the DMAX extension element and the rising edge blanking element are implemented using analog circuit components.

Example 17

A method comprising: determining whether a voltage of an alternating current (AC) input signal exceeds a voltage threshold; in response to determining that the AC input signal exceeds the voltage threshold, adjusting a duty cycle of a control signal by setting an on-time of the control signal to be no more than a threshold on-time; in response to determining that the AC input signal does not exceed the voltage threshold, adjusting the duty cycle of the control signal by extending the on-time of the control signal by a predetermined amount of on-time, wherein the duty cycle of the control signal includes at least a predetermined off-time.

Example 18

The method of example 17, wherein the AC input signal and the control signal is received at power factor correction (PFC) stage and a PFC controller generates the control signal.

Example 19

The method of any combination of examples 17-18, wherein voltage threshold is 180 volts.

Example 20

The method of any combination of examples 17-19, wherein the predetermined off-time is configured to start at substantially the same time as the end the predetermined amount of on-time.

Various examples of the disclosure have been described. These and other examples are within the scope of the following claims.

The invention claimed is:

1. A circuit comprising a maximum duty cycle (DMAX) extension element; and a rising edge blanking element operatively coupled to the DMAX extension element, wherein:
   the DMAX extension element is configured to adjust a duty cycle of a first switching cycle of a control signal, and
   the rising edge blanking element is configured to blank the rising edge of a second switching cycle of the control signal, wherein:
   the second switching cycle is a next switching cycle subsequent to the first switching cycle, and
   the rising edge blanking element causes the control signal to include at least a predetermined off-time.

2. The circuit of claim 1, further comprising a high line detect element operatively coupled to the DMAX extension element, the rising edge blanking element and an alternating current (AC) input signal, wherein the high line detection element:
   is configured to determine whether a voltage in the AC input signal exceed a voltage threshold, and
   in response to determining that the voltage in the AC input signal exceeds the voltage threshold, the high line detection element causes the rising edge blanking element to adjust the duty cycle by limiting the duty cycle of the first switching cycle and the second switching cycle.

3. The circuit of claim 2, wherein in response to determining that the voltage in the AC input signal does not exceed the voltage threshold, the high line detection element causes the DMAX extension element to adjust the duty cycle by extending the duty cycle of the first switching cycle and the second switching cycle.

4. The circuit of claim 3, wherein a predetermined off-time is configured to start at substantially the same time as an end of the first switching cycle.

5. The circuit of claim 1, wherein the off-time is a logical low signal.

6. The circuit of claim 1, wherein the DMAX extension element and the rising edge blanking element are implemented using analog circuit components.

7. The circuit of claim 1, wherein the DMAX extension element and the rising edge blanking element are implemented using a microcontroller.

8. The circuit of claim 1, wherein the DMAX extension element and the rising edge blanking element are implemented using digital processing circuitry.

9. The circuit of claim 8, wherein the circuit further comprises non-transient computer-readable storage medium, wherein the digital processing circuitry is operatively coupled to the computer-readable storage medium and wherein the computer-readable storage medium comprises instructions for the digital processing circuitry.

10. A circuit comprising:
a driver circuit, wherein the driver circuit is configured to output a signal to a power factor correction (PFC) stage; and
a total harmonic distortion (THDi) reduction circuit operatively coupled to the driver circuit, wherein the output of the THDi circuit is configured to regulate the signal output by the driver circuit, the THDi reduction circuit comprising:
a maximum duty cycle (DMAX) extension element configured to adjust a duty cycle of a first switching cycle of a control signal; and
a rising edge blanking element operatively coupled to the DMAX extension element, wherein:
the rising edge blanking element is configured to blank the rising edge of a second switching cycle of the control signal, wherein:
the second switching cycle is a next switching cycle subsequent to the first switching cycle, and
the rising edge blanking element causes the control signal to include at least a predetermined off-time.

11. The circuit of claim 10, further comprising a digital PFC stage controller configured to output the control signal.

12. The circuit of claim 10, further comprising a THDi timer element operatively coupled to the DMAX extension element and the rising edge blanking element, wherein the THDi timer element is configured to set an amount of extension time for the DMAX extension element to extend the duty cycle of the first switching cycle and is configured to set an amount of blanking time for the rising edge blanking element to blank the rising edge of the second switching cycle.

13. The circuit of claim 10, further comprising a PFC controller operatively coupled to the THDi reduction circuit and configured to output the control signal.

14. The circuit of claim 10, further comprising a high line detect element operatively coupled to the DMAX extension element, the rising edge blanking element and an alternating current (AC) input signal, wherein the high line detection element:
is configured to determine whether a voltage in the AC input signal exceeds a voltage threshold, and
in response to determining that the voltage in the AC input signal exceeds the voltage threshold, the high line detection element causes the rising edge blanking element to limit the duty cycle of the first switching cycle and the second switching cycle.

15. The circuit of claim 14, wherein in response to determining that the voltage in the AC input signal does not exceed the voltage threshold, the high line detection element causes the DMAX extension element to adjust the duty cycle by extending the duty cycle of the first switching cycle.

16. The circuit of claim 10, wherein the DMAX extension element and the rising edge blanking element are implemented using analog circuit components.

17. A method comprising:
determining whether a voltage of an alternating current (AC) input signal exceeds a voltage threshold;
in response to determining that the voltage of the AC input signal exceeds the voltage threshold, adjusting a duty cycle of a control signal by setting an on-time of the control signal to be no more than a threshold on-time;
in response to determining that the AC input signal does not exceed the voltage threshold, adjusting the duty cycle of the control signal by extending the on-time of the control signal by a predetermined amount of on-time, wherein the duty cycle of the control signal includes at least a predetermined off-time.

18. The method of claim 17, wherein the AC input signal and the control signal is received at power factor correction (PFC) stage and a PFC controller generates the control signal.

19. The method of claim 17, wherein voltage threshold is 180 volts.

20. The method of claim 17, wherein the predetermined off-time is configured to start at substantially the same time as the end the predetermined amount of on-time.

* * * * *